United States Patent [19]
Simon et al.

[11] Patent Number: 6,060,550
[45] Date of Patent: May 9, 2000

[54] POLYETHYLENE WAX AS PROCESSING AID FOR HOT-MELT ADHESIVE COMPOSITIONS

[75] Inventors: Ulrich Simon, Herne; Thorsten Gurke, Haltern, both of Germany

[73] Assignee: Huels Aktiengesellschaft, Marl, Germany

[21] Appl. No.: 09/172,267

[22] Filed: Oct. 14, 1998

[30] Foreign Application Priority Data

Oct. 23, 1997 [DE] Germany ............... 197 46 834

[51] Int. Cl.⁷ .................. C08L 91/06; C08L 67/03
[52] U.S. Cl. ............. 524/489; 524/487; 525/173; 525/174; 525/177
[58] Field of Search ................. 524/487, 489; 525/173, 174, 177

[56] References Cited

U.S. PATENT DOCUMENTS 4,217,426  8/1980  McConnell et al. ............. 525/177

*Primary Examiner*—Peter A. Szekely
*Attorney, Agent, or Firm*—Oblon, Spivak, McClelland, Maier & Neustadt, P.C.

[57] ABSTRACT

A hot-melt adhesive composition for coating a sheet-like structure which comprises a hot-melt adhesive powder and a polyethylene wax as processing aid.

21 Claims, No Drawings

POLYETHYLENE WAX AS PROCESSING AID FOR HOT-MELT ADHESIVE COMPOSITIONS

BACKGROUND OF THE INVENTION

1. Field of the Invention

The present invention relates to a hot-melt adhesive composition comprising polyethylene wax as processing aid and intended for coating sheetlike structures such as textiles, leather, foam materials or plastic films.

2. Discussion of the Related Art

Hot-melt adhesive compositions are known which are applied preferably in the form of an aqueous paste in a pattern to a sheetlike structure that is to be coated, followed by drying and sintering. The sintered product constitutes the hot-melt adhesive composition. The coated sheetlike structures, in the form of webs or cut blanks, are laminated with other sheetlike webs or blanks, under the anion of pressure and comparatively mild temperature, to form laminates of particularly high washing stability and adhesion.

Numerous hot-melt adhesive compositions for the screen printing technique are known. They are composed predominantly of aqueous-pastelike mixtures of fine hot-melt adhesive powders which, even in relatively coarse particle form, can be applied per se directly for coating by the scatter or powder dot technique. The hot-melt adhesive compositions most commonly employed today are based on copolyamides, copolyesters or high-density polyethylene.

For pasting up the fine hot-melt adhesive powders to prepare the adhesive layer, use is made of special suspending or dispersing agents, which give the pasted-up formulations cleaner printing properties. In addition, dispersing agents should also bring forth particular attributes, examples being the prevention of sedimentation of the mixed-in powders, crisply contoured print formation, controlled penetration of the hot-melt adhesive paste, prevention of outer fabric strikethrough, avoidance of strikeback in the course of fixing, or the elimination of the phenomenon of edges sticking together when the sheetlike structures are cut to size. Examples of such dispersing agents have been described, for example, in the patents DE-B 20 07 971, DE-B 22 29 308, DE-B 24 07 505, DE-B 25 07 504 and DE-B 35 10 109. Plasticizers can be added to the dispersing agents. In many cases, additives comprising high molecular mass polyethylene oxide are also added, the intention being thereby to improve the flow properties of the paste.

When preparing hot-melt adhesive powders, stearates (of Ca, Mg and Zn) are added in order to improve removal from the screen and to take account of performance requirements. With the aid of these products, it is possible to vary the bulk density and free-flow properties of the powders. Amorphous fine powder fractions (from 0 to 80 μm), however, tend to form lumps even when the amount is relatively large (0.5%).

However, in connection with the processing of low-melting, amorphous polyester and polyamide hot-melt adhesives of low viscosity there is a known coating problem, namely excessive tack after the coated inliner leaves the drying oven. When considering the tack, or tackiness, of a coated surface, a distinction is made between permanent tack and temporary tack. Temporary tack is the time until recrystallization, i.e. the time until the adhesive falls below the melting temperature. The result is sticking to the calender walls (scatter coating) or sticking together of the individual plies on the winder, which in the course of further processing leads to great difficulties (material showing, lengthening).

SUMMARY OF THE INVENTION

The object of the invention is therefore to find a hot-melt adhesive composition which does not have the processing disadvantages described.

It has now surprisingly been found that hot-melt adhesive compositions, in accordance with the present invention, containing a polyethylene wax, do not have these disadvantages.

Although EP-B 0 575 900 describes the use of polyethylene wax for detackifying polymer surfaces, a way of overcoming the tack problem described in the present application cannot be derived from EP-B 0 575 900.

The polyethylene wax of the invention must exhibit the following properties:

Molecular weight: from 500 to 10,000 g/mol, preferably from 1000 to 5000 g/mol

Softening point: from 100 to 130° C., preferably from 110 to 115° C.

Viscosity at 150° C.: from 100 to 380 mPa·s, preferably 140 mPa·s.

DESCRIPTIONS OF THE PREFERRED EMBODIMENTS

Examples of suitable commercial polyethylene waxes are, available from BASF: AF, AF30, AF31, AF 322, and available from Hüls: VESTOWAX A 616, A 415, A 227, A 235, or an oxidized polyethylene wax such as AO 15125, AO 1535, AO 1539. The oxidized polyethylene waxes have softening points of from 104 to 130° C., preferably from 106 to 114° C., and a viscosity of from 100 to 130 mPa·s at 120° C.

The wax, or the oxidized wax, is incorporated into the hot-melt adhesive in amounts of from 0.2 to 6% by weight, based on hot-melt adhesive powder. For scatter coating and powder dot coating, the wax is employed in amounts of from 0.1 to 1% by weight, preferably from 0.2 to 0.5% by weight, based on hot-melt adhesive powder. For paste coating, the wax is used in amounts of from 2 to 6% by weight, preferably from 2 to 3% by weight, based on the overall paste.

In the case of scatter and powder point application, it is advisable to disperse the polyethylene wax as homogeneously as possible in the powder mixture. This means applying it to the granules prior to grinding, or adding it to a masterbatch at the homogenization stage.

In the case of paste coating, the polyethylene wax can be added separately, as an additive.

Surprisingly, polyethylene wax brings major advantages in connection with the various application methods.

In the case of scatter coating, it prevents sticking to calender rolls when coating with amorphous copolyamides and copolyesters or when scattering on large amounts, even of crystalline hot-melt adhesives which still have a very high heat content (amount deployed from about 0.2 to 0.5%).

In the case of paste coating, good dispersion of hot-melt adhesive powders in aqueous systems is obtained. In addition, sticking together of the individual sheets in the course of winding is prevented when plasticized, low-melting, amorphous polyamides or polyesters are being used (amount deployed about 3%).

In the case of powder coatings, a marked improvement in the coating image is observed. The individual dots are more raised and each dot is rounder and smoother. There are fewer residues in the recesses of the application rollers. Here too, more rapid recrystallization of the melt is observed and the coating tack disappears so that there are no problems in the course of winding. The washing results at 60° C. are markedly better in the case of polyester coatings if 0.2% of polyethylene wax is added to the powder.

In the course of the milling, screening and dispensing of amorphous polyesters, the free-flow properties are improved and the powders no longer tend to form lumps in the course of transportation.

The following Examples are described also in the priority document, German patent application 197 46 834.9 filed Oct. 23, 1997, which is incorporated in its entirety herein by reference.

EXAMPLES

A 40 g/m² plain-woven ecru cotton batiste inliner was powder dot coated on a 1 m wide Saladin unit with 30 mesh.
Machine parameters:
Heating roll temperature: 220° C.
Engraved roll temperature: 45° C.
Speed: 20 m/min
Coating powders:
Experiment a) VESTAMELT 4680-P 816 Standard
Experiment b) VESTAMELT 4680-P 816 made up with 0.2% polyethylene wax (VESTOWAX A 616 SF) in a high-speed mixer. VESTAMELT 4680 is a copolyester hot-melt adhesive available from Hüls. The polyesters are formed from isophthalic acid, terephthalic acid, butanediol, hexanediol and $C_6$ to $C_{12}$ dicarboxylic acids.
VESTAWAX A 616 SF (available from Hüls) is a wax having a dropping point of from 118 to 128° C., a molar mass of about 1600 g/mol and a viscosity at 150° C.<140 mPa·s.
Flow properties and dot pattern:
Experiment a) gave a slightly torn, rough dot.
Experiment b) gave a clean, uniform dot pattern with a soft textile handle. Each individual dot was circular and raised
Peel test and washing stability:
Both inliners as described above were pressed together with a cotton shirt material at a joining temperature of 127 ° C., with a fixing time of 10 seconds and a linear pressure of 4N. After 24 hours, the bonded materials were cut into 5 cm wide strips and a peel test was conducted.
1) Primary adhesion
2) After 1 and 3 washes at 60° C.

Saladin unit: 2 m wide
Coating temperature after
leaving the infrared field: 135° C.
Calendering
speed: 12 m/min
Powder add-on: 80 g/m²
Needlefelt: Polypropylene (beige)
Coating powders:
a) VESTAMELT 350-P 4 Standard
b) VESTAMELT 350-P 4 with 0.5% polyethylene wax
Scatter pattern:
No polywax a) Powder flowed prematurely from the needle belt of the scatterer, resulting in irregular application.
with polywax b) Powder held up well in the needle belt of the scatterer, resulting in uniform powder application.
Coating behavior:
a) After just a short time, powder was observed to have transferred from the coated needlefelt to the calender rolls. Treatment of the chrome rolls with silicone fluid brought only temporary relief.
b) After 1 hour of coating with the powder of the invention, still no transfer to the calender rolls was observed.

What is claimed is:

1. A sheet coating composition comprising an amorphous polymeric hot-melt adhesive powder and a polyethylene wax present in an amount of from 0.1 to 6% by weight, based on the hot-melt adhesive powder.

2. The composition of claim 1, wherein said polyethylene wax is present in an amount of from 0.2 to 6% by weight, based on the hot-melt adhesive powder.

3. The composition of claim 1, wherein said polyethylene wax is present in an amount of from 0.1 to 1% by weight, based on the hot-melt adhesive powder.

4. The composition of claim 1, wherein said polyethylene wax is present in an amount of from 2 to 6% by weight, based on the total composition.

5. The composition of claim 1, wherein said polyethylene wax is present in an amount of from 2 to 3% by weight, based on the total composition.

6. The composition of claim 1, wherein said polyethylene wax is present in an amount of from 0.2 to 0.5% by weight, based on the hot-melt adhesive powder.

7. The composition of claim 1, wherein said polyethylene wax has a molecular weight of from 500 to 10,000 g/mol.

8. The composition of claim 1, wherein said polyethylene wax has a molecular weight of from 1000 to 5000 g/mol.

9. The composition of claim 1, wherein said polyethylene wax has a softening point of from 100 to 130° C. and a viscosity at 150° C. of from 100 to 380 mPa·s.

TABLE 1

|  | Primary adhesion | 1 × 60° C. wash | 3 × 60° C. wash | Surface assessment | | | Add-on |
| --- | --- | --- | --- | --- | --- | --- | --- |
| Experiment a) In the absence of polywax | 8 N/5 cm | 4 N/5 cm | No adhesion | smooth | bubbly | large bubbles | 10 g/m² |
| Experiment b) In the presence of polywax | 11 N/5 cm | 10 N/5 cm | 6 N/5 n | smooth | smooth | slight bubbles | 11 g/m² |

Advantages of the coating system of the invention:
1) Better coating behavior (more circular dot, more uniform dot pattern);
2) Better primary adhesion;
3) Better stability to 60° C. wash.
Scatter coating of a needlefelt for producing parcel shelves:
Scatter coating was carried out with VESTAMELT 350-P 4 Standard and VESTAMELT 350-P 4 with VESTOWAX A 616 SF
Machine parameters:

10. The composition of claim 1, wherein said polyethylene wax has a softening point of from 110 to 115° C. and a viscosity at 150° C. of 140 mPa·s.

11. The composition of claim 1, wherein said polyethylene wax is an oxidate of the polyethylene wax.

12. The composition of claim 11, wherein said oxidate of the polyethylene wax has a softening point of from 104 to 130° C. and a viscosity at 120° C. of from 100 to 130 mPa·s.

13. A method for coating a sheet, comprising an amorphous polymeric hot-melt adhesive powder and a polyethylene wax present in an amount of from 0.1 to 6% by weight, based on the hot-melt adhesive powder.

14. The method of claim 13, wherein said method comprises scatter coating and said polyethylene wax is present in an amount of from 0.1 to 1% by weight, based on the hot-melt adhesive powder.

15. The method of claim 13, wherein said method comprises scatter coating and said polyethylene wax is present in an amount of from 0.2 to 0.5% by weight, based on the hot-melt adhesive powder.

16. The method of claim 13, wherein said method comprises paste coating and said polyethylene wax is present in an amount of from 2 to 6% by weight, based on the total paste.

17. The method of claim 13, wherein said method comprises paste coating and said polyethylene wax is present in an amount of from 2 to 3% by weight, based on the total paste.

18. The method of claim 13, wherein said method comprises powder dot coating and said polyethylene wax is present in an amount of from 0.1 to 1% by weight, based on the hot-melt adhesive powder.

19. The method of claim 13, wherein said method comprises powder dot coating and said polyethylene wax is present in an amount of from 0.2 to 0.5% by weight, based on the hot-melt adhesive powder.

20. The method of claim 14 or 15, wherein said polyethylene wax is distributed substantially homogeneously into said composition.

21. The method of claim 16, wherein said polyethylene wax is added as an additive in the course of paste coating preparation.

* * * * *